US011790805B2

(12) United States Patent
Hopf

(10) Patent No.: US 11,790,805 B2
(45) Date of Patent: Oct. 17, 2023

(54) DENT REMOVAL TEACHING SYSTEM

(71) Applicant: Steven Lindy Hopf, Riverside, CA (US)

(72) Inventor: Steven Lindy Hopf, Riverside, CA (US)

( * ) Notice: Subject to any disclaimer, the term of this patent is extended or adjusted under 35 U.S.C. 154(b) by 134 days.

(21) Appl. No.: 16/395,785

(22) Filed: Apr. 26, 2019

(65) Prior Publication Data

US 2020/0342784 A1  Oct. 29, 2020

(51) Int. Cl.
*G09B 19/24* (2006.01)
*B21D 1/06* (2006.01)

(52) U.S. Cl.
CPC ............. *G09B 19/24* (2013.01); *B21D 1/06* (2013.01)

(58) Field of Classification Search
CPC . B21D 1/06; B23Q 3/00; B23Q 3/005; B23Q 3/061; B23Q 3/02
See application file for complete search history.

(56) References Cited

U.S. PATENT DOCUMENTS

| | | | | |
|---|---|---|---|---|
| 3,085,798 A | * | 4/1963 | Gavette | B25H 1/0007 269/17 |
| 3,535,906 A | | 10/1970 | Swick et al. | |
| 3,852,990 A | | 12/1974 | Sparling | |
| 5,752,834 A | * | 5/1998 | Ling | G09B 9/12 434/58 |
| 5,903,975 A | | 5/1999 | Gammill | |
| 6,024,348 A | * | 2/2000 | Ventura | B05B 13/0285 269/104 |
| 8,651,030 B2 | * | 2/2014 | Coffman | B25H 1/16 108/169 |
| 9,826,577 B2 | | 11/2017 | Meichtry et al. | |
| 2009/0071384 A1 | * | 3/2009 | Tajima | D05C 9/06 112/103 |
| 2011/0230800 A1 | * | 9/2011 | Binns | A61H 1/0281 601/5 |
| 2011/0247530 A1 | * | 10/2011 | Coffman | B25H 1/02 108/116 |
| 2012/0119427 A1 | * | 5/2012 | Weissenborn | A63C 11/04 269/95 |

(Continued)

FOREIGN PATENT DOCUMENTS

KR  200201325 Y1 * 11/2000

OTHER PUBLICATIONS https://www.youtube.com/watch?v=_OZx1OwTWCc "How To—PDR Accessing door window panel bodyline dent Freebie Dent!" posted Mar. 2, 2018 (Year: 2018).*

(Continued)

*Primary Examiner* — Peter S Vasat
*Assistant Examiner* — Jennifer L Korb

(57) ABSTRACT

A dent removal teaching system may include a base frame and an upper frame movably coupled, or articulating with the base frame. The upper frame may include a plurality of access holes, whereby a dent removal tool may be inserted into one of the plurality of access holes. The dent removal teaching system may also include a body panel which may be releasably secured to the upper frame, so that a user may apply force to a dent in the body panel using the dent removal tool. This combination provides a teaching environment to practice the removal of a dent from a vehicle body.

15 Claims, 7 Drawing Sheets

(56) References Cited

U.S. PATENT DOCUMENTS

| | | | | |
|---|---|---|---|---|
| 2012/0242022 A1* | 9/2012 | Gagnon, Jr. | ............ | B25B 11/00 |
| | | | | 269/9 |
| 2014/0212852 A1* | 7/2014 | Spencer | ................ | G09B 19/00 |
| | | | | 108/1 |
| 2016/0282016 A1* | 9/2016 | Ash | ........................ | H02S 20/10 |
| 2017/0004738 A1* | 1/2017 | Pravong | ............... | G09B 23/285 |
| 2017/0332778 A1* | 11/2017 | Ergun | .................... | A47B 23/04 |
| 2020/0066183 A1* | 2/2020 | Langton | ................ | G09B 19/24 |

OTHER PUBLICATIONS https://www.youtube.com/watch?v=_OZx1OwTWCc, How To—�� PDR Accessing door window panel bodyline dent Freebie Dent!, posted Mar. 2, 2018 (Year: 2018).*
https://www.youtube.com/watch?v=6_iXK_YgWQQ, New Door? No! I'll fix it using PDR, posted Nov. 20, 2018. (Year: 2018).*
"Bolted Body Panels," Carsprays.co.uk, https://web.archive.org/web/20170426055747/https://carsprays.com/replacement-body-panels/bolted-body-panels/, Apr. 26, 2017 (Year: 2017).*
U.S. Appl. No. 16/112,643, Langton.

* cited by examiner

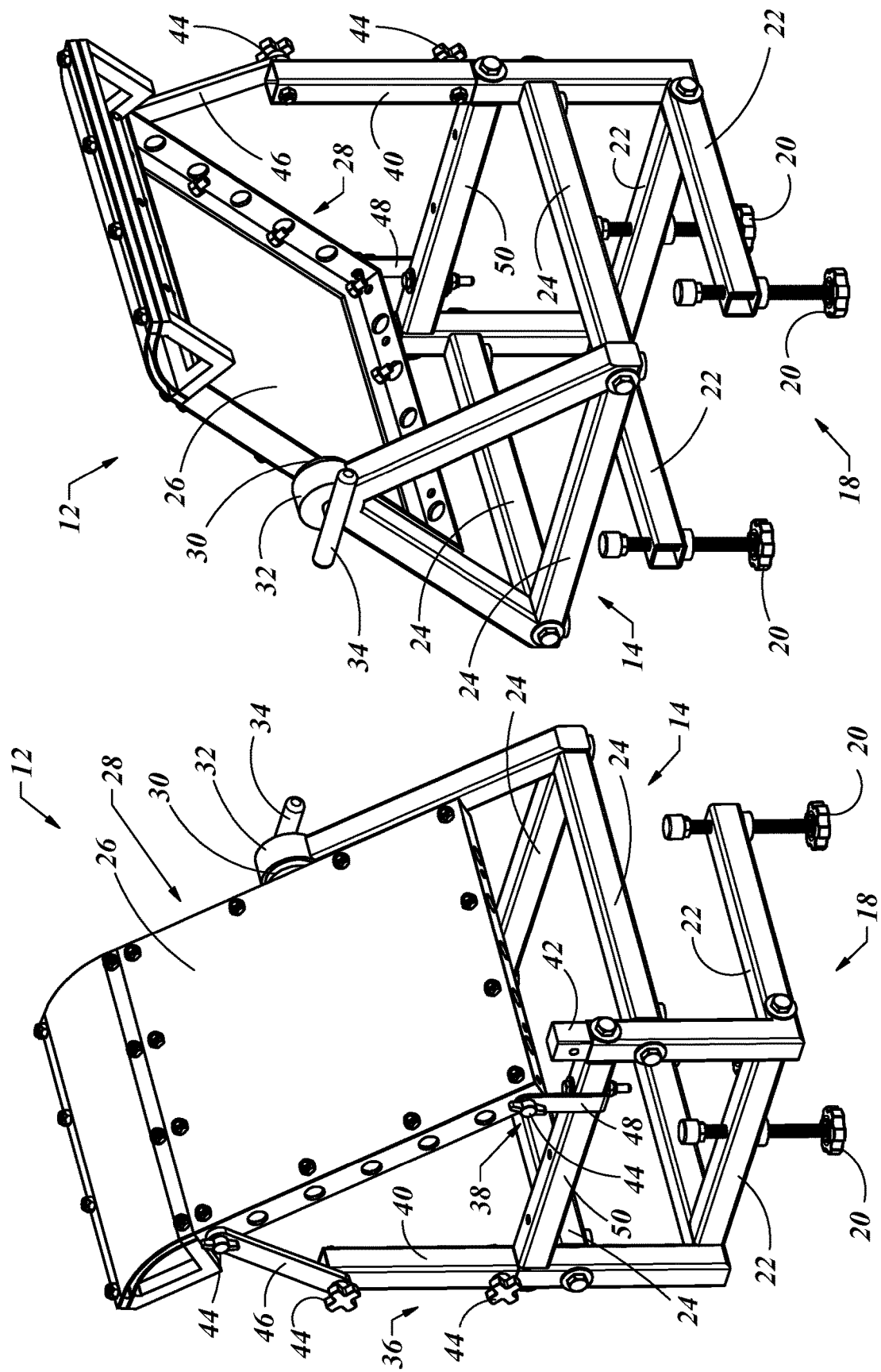

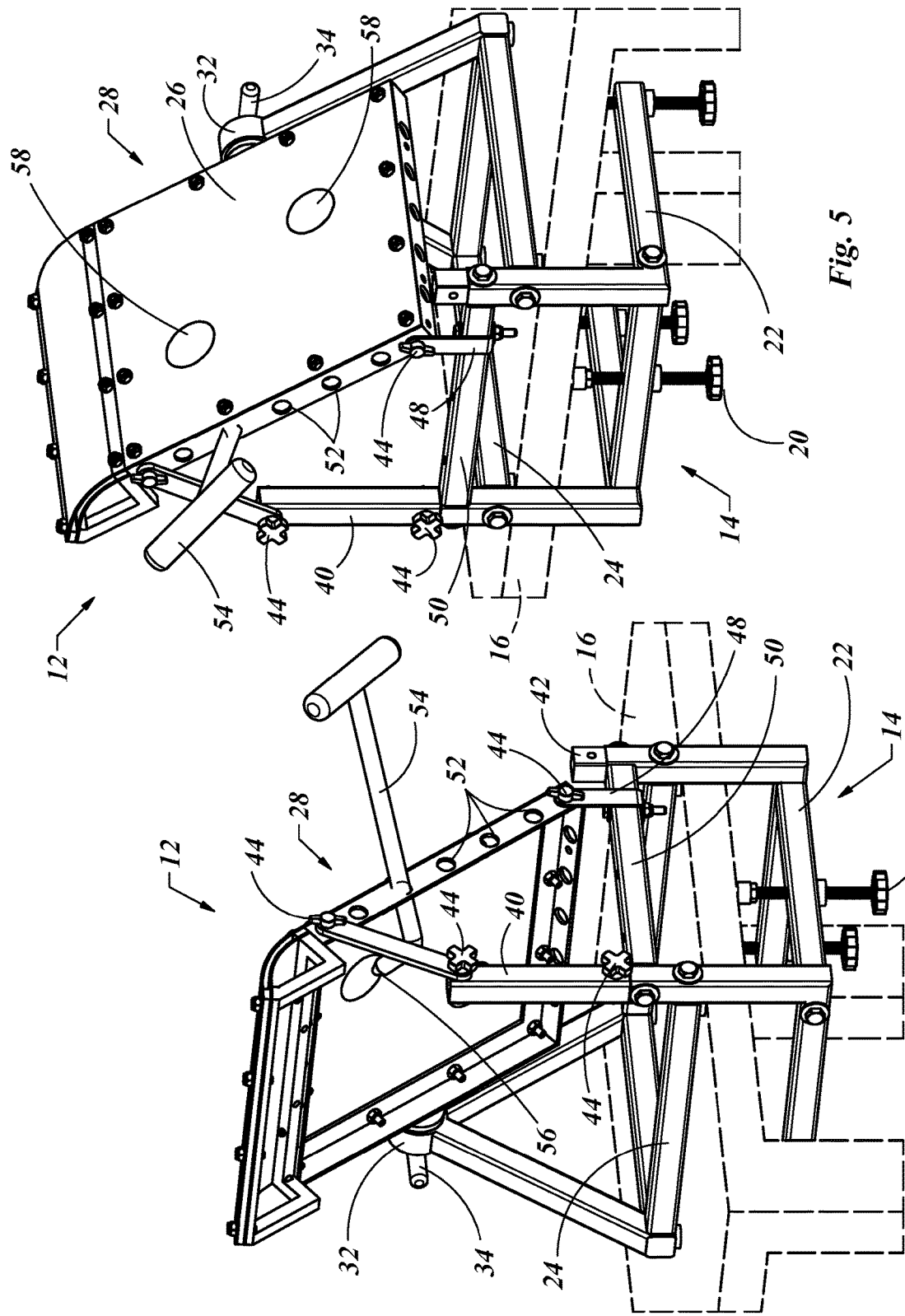

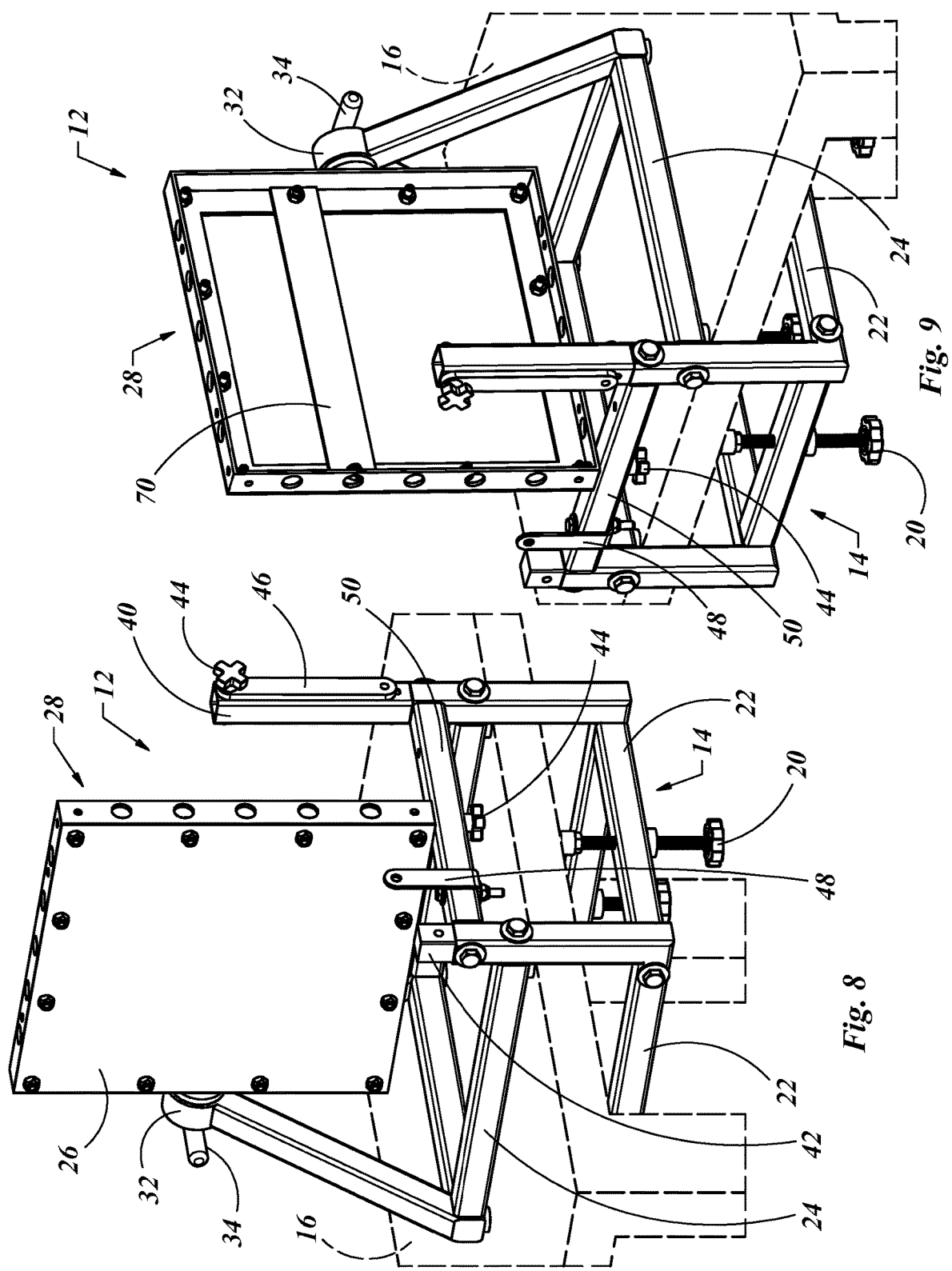

DENT REMOVAL TEACHING SYSTEM

FIELD OF THE INVENTION

The present invention generally relates to teaching devices, more particularly, to teaching devices that may be used to improve the skill of someone training to remove dents from metal covers such as the body of a vehicle.

BACKGROUND OF THE INVENTION

Teaching systems may be used to simulate an environment the student may encounter in the real world. It is generally considered advantageous to closely replicate the conditions the student may encounter when they are no longer a student. This may allow the student to learn and practice and art to such a degree that the learned process may seem natural when faced with performing this task after graduating from student to practitioner.

It may also be advantageous for the teaching system to be compact and transferrable to a classroom environment. In many cases a single instructor may be teaching multiple students. It may be desired that the teaching tool be positioned on a desk, or similar support, and yet bring with it a variety of variables, as may be seen or simulated when performing the task to be taught.

Paintless dent removal (PDR) is a skill that must be learned by repetitive practice by the student. The techniques may be instructed by a single teacher to a variety of students and then the students must learn by doing. PDR may require specific physical strength that is also developed by repetitive action. As body panels of a vehicle to be worked on may be positioned vertically, horizontally or angled to the right or to the left relative to the practitioner, it may be important that the teaching system adjust to do the same.

It should, therefore, be appreciated that there is a need for a dent removal teaching system which may be adjusted into multiple configurations and securely mountable to a desk or other structure. The PDR teaching system may include pre-dented replaceable panels provided to replicate commonly found dents for the students to remove so the students may practice in a learning environment.

SUMMARY OF THE INVENTION

The present invention may include a base frame and an upper frame movably coupled, or articulating with the base frame. The upper frame may include a plurality of access holes, whereby a dent removal tool may be inserted into one of the plurality of access holes. The present invention may also include a body panel which may be releasably secured to the upper frame, whereby a user may apply force to a dent in the body panel using the dent removal tool, thus providing a teaching environment to practice the removal of a dent from a vehicle body.

The dent removal teaching system may include the upper frame being pivotally coupled to the base frame. This may be aided by a screw lock. The upper frame may be coupled to the base frame by at least two points on the upper frame. The upper frame may be movably coupled to the base frame and locked into more than one, and possibly five, different positions relative to the base frame.

The dent removal teaching system may include a mounting system, whereby the mounting system may enable the base frame to be releasably secured to a structure, such as a table. The mounting system may include more than one screw clamp that may be movably mounted to the base frame.

The dent removal teaching system may further include a roof rail simulator that may be releasably coupled to a first end of the upper frame, the roof rail simulator may include a radiused body sheet. The dent removal teaching system may also include a support brace which may be coupled to the upper frame opposite to the body panel. The support brace may simulate a reinforcement brace in a vehicle body.

For purposes of summarizing the invention and the advantages achieved over the prior art, certain advantages of the invention have been described herein. Of course, it is to be understood that not necessarily all such advantages can be achieved in accordance with any particular embodiment of the invention. Thus, for example, those skilled in the art will recognize that the invention can be embodied or carried out in a manner that achieves or optimizes one advantage or group of advantages as taught herein without necessarily achieving other advantages as may be taught or suggested herein.

All of these embodiments are intended to be within the scope of the invention herein disclosed. These and other embodiments of the present invention will become readily apparent to those skilled in the art from the following description of the preferred embodiments and drawings, the invention not being limited to any particular preferred embodiment(s) disclosed.

BRIEF DESCRIPTION OF THE DRAWINGS

Embodiments of the present invention will now be described, by way of example only, with reference to the following drawings, in which:

FIG. 1 is an isometric view of a dent removal teaching system shown from a right upper perspective and the upper frame is angled to the right.

FIG. 2 is an isometric view of the dent removal teaching system of FIG. 1, shown from the right rear perspective, thereby showing the backside of the dent removal teaching system.

FIG. 4 is an isometric view of the dent removal teaching system of FIG. 3 shown with a dent removal tool positioned to remove a dent in the body panel.

FIG. 5 is an isometric view of the dent removal teaching system of FIG. 4 shown from a right upper perspective.

FIG. 8 is an isometric view of the dent removal teaching system of FIG. 3 shown from a left upper perspective, where the upper frame is positioned vertically and the roof rail simulator has been removed.

FIG. 9 is an isometric view of the dent removal teaching system of FIG. 8 shown from a right upper perspective, where the upper frame is positioned vertically.

DETAILED DESCRIPTION OF THE INVENTION

Figure 3:
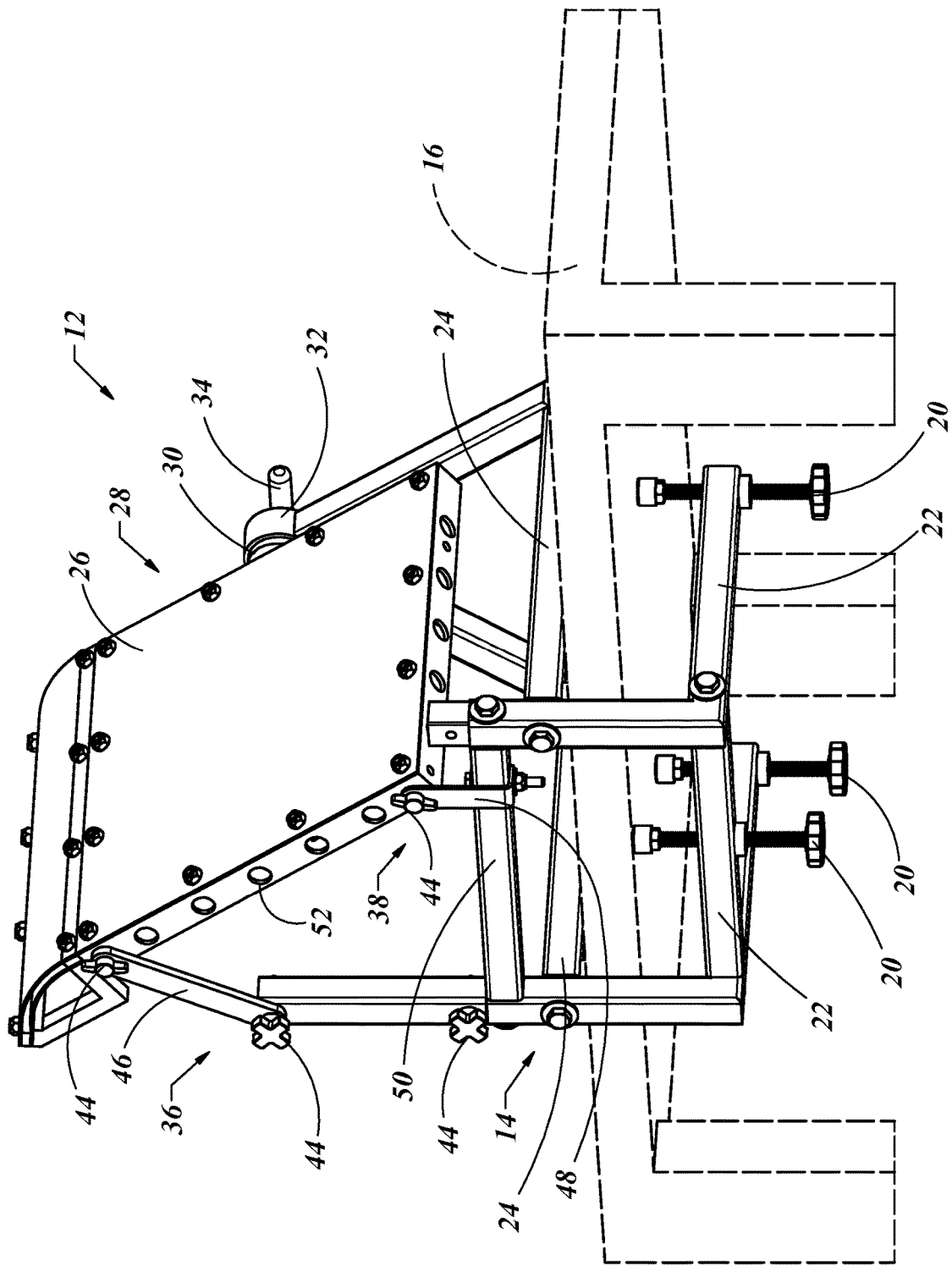
FIG. 3 is an isometric view of the dent removal teaching system of FIG. 1, shown from a right lower perspective and attached to a table.

With reference to the illustrative drawings and particularly to FIGS. 1-3, there is shown a dent removal teaching system 12. The dent removal teaching system 12 may include a base frame 14 that may be releasably secured to a desk, table 16 or other secure object by way of a mounting system 18. The mounting system 18 may include one or more than one screw clamps 20. The screw clamps 20 may be movably mounted to a lower support 22 of the base frame 14. Adjacent to the lower supports 22, an upper support 24 may be provided, such that a table 16 may be positioned between the lower supports 22 and the upper supports 24 of the base frame 14. The screw clamps 20 may be advanced toward the upper supports 24, thereby capturing the table 16 between the ends of the screw clamps 20 and the upper supports 24. This may result in a secure mounting of the base frame 14 to the table 16. As previously mentioned, the process of PDR may require a significant amount of force being applied to a workpiece. As such, it may be important that the base frame 14, and therefore the dent removal teaching system 12, be held firmly in place when force is applied to the dent removal teaching system 12.

Another important aspect of the dent removal teaching system 12 is providing a workpiece, or body panel 26 that may be manipulated into multiple positions relative to the base frame 14. This may be accomplished by use of an upper frame 28 being movably mounted to the base frame 14. In this embodiment, the upper frame 28 may include an articulating member 30, which may be pivotally coupled to an articulating support 32 of the base frame 14. The upper frame 28 may then rotate about a central axis of the articulating support 32 and locked into a position by way of a screw lock 34. The screw lock 34 may include a threaded rod that may bind the articulating member 30 of the upper frame 30 to the articulating support 32 of the base frame 14, thereby securing the upper frame 28 to the base frame 14.

As discussed, it may be important for the body panel 26, and by association the upper frame 28, to remain rigid relative to the base frame 14 when force is applied to the body panel 26. Therefore, it may be desirable to add additional supports to further couple the upper frame 28 to the base frame 14. In this embodiment, two additional supports are provided in the form of a left mount 36 and a right mount 38. The left mount 36, the right mount 38 and the screw lock 34 may provide three points to couple the upper frame 28 to the lower frame 14 and thereby hold the body panel 26 stationary relative to the base frame 14.

The left mount 36 may include a removable vertical member 40, which may act as an extension to the base frame 14. The removable vertical member 40 may be received by a stud 42 mounted on the base frame 14. The stud 42 may be positioned on both the left side and the right side of the base frame 14, so as to allow the removable vertical member 40 to be positioned on the left, the right or both, as will be disclosed. The removable vertical member 40 may be secured onto the stud 42 by a knob screw 44. This may be desirable in that the removable vertical member 40 may be added or removed without the need for hand tools. On a top end of the removable vertical member 40 a connector link 46 may connect the removable vertical member 40 (acting as an extension of the base frame 14) to a left end of the upper frame 28. The connector link 46 may be secured to the removable vertical member 40 and the upper frame 28 by two additional knob screws 44.

The right mount 38 may include a mount bracket 48 secured to a cross member 50, which may be part of the base frame 14. The mount bracket 48 may then be coupled to a right end of the upper frame 28 by way of another knob screw 44. The three points on the upper frame 28, specifically the left end of the upper frame 28, the right end of the upper frame 28 and the screw lock 34, may provide a secure mounting of the upper frame 28 to the base frame 14.

The application of force to the body panel 26 is illustrated in FIGS. 4-5. The upper frame 28 may include a plurality of access holes 52. Each access hole 52 may allow the shaft of a dent removal tool 54 to be inserted therein and position the tool tip 56 on a dent 58 in the body panel 26. The user may end apply force to the dent removal tool 54 using the upper frame 28 as a fulcrum to generate a force on the dent 58 great enough to push the dent 58 in the body panel 26 out, thereby making it smooth again. This process is similar to what a technician does to remove a dent from a car body as the result of a minor accident or hail damage. This process is commonly called Paintless Dent Removal (PDR) as the paint on the vehicle body is many times pliable enough to not crack due to the original damage, or to the force applied to remove the dent. This eliminates the need for painting the vehicle body after the work is completed, thus saving time and money. There is a good deal of skill and technique that is incorporated in the process and the dent removal teaching system 12 provides a classroom version of the condition for the student to practice and refine their art.

Figure 6:
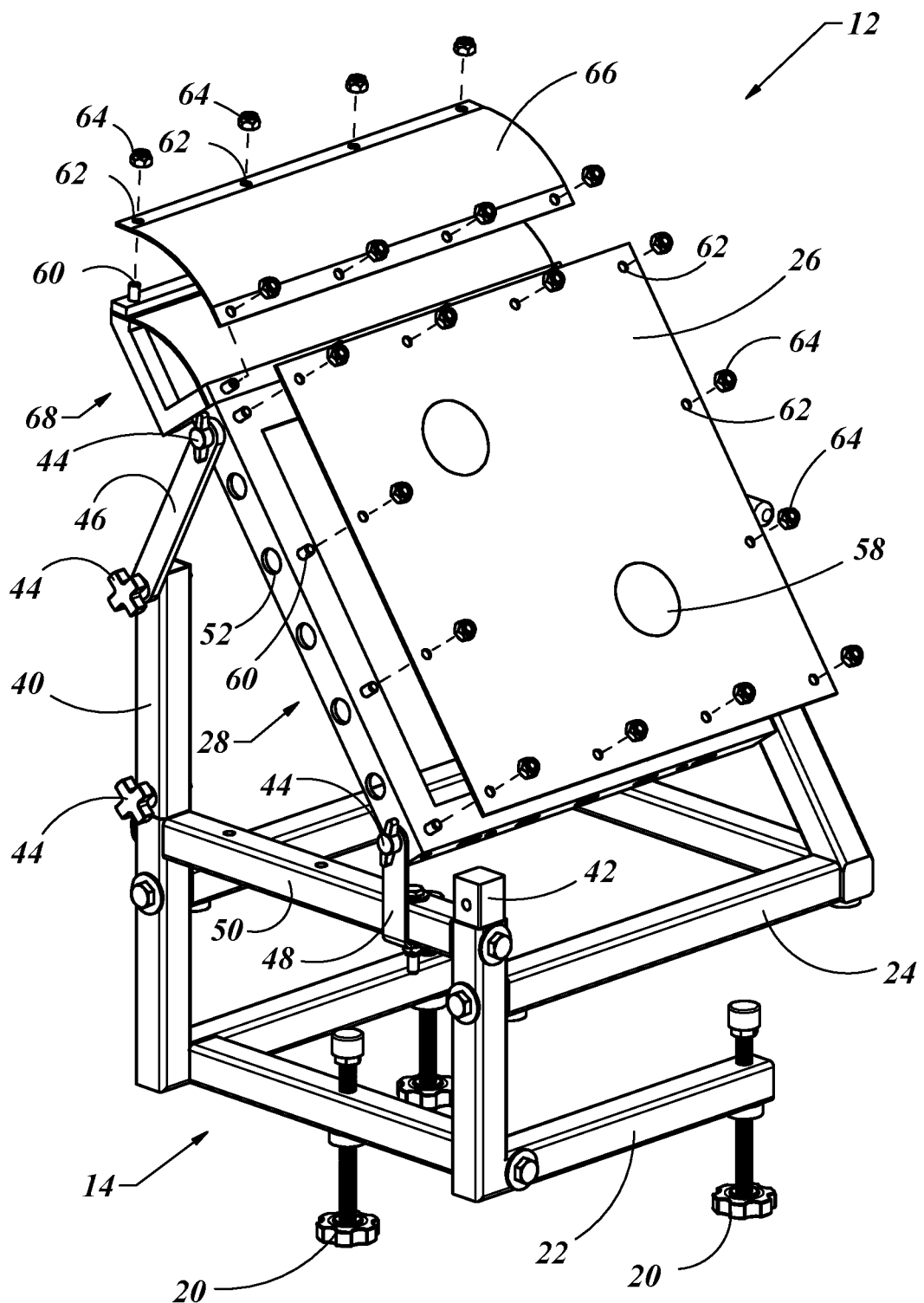
FIG. 6 is an isometric partially exploded view of the dent removal teaching system of FIG. 1 with the pre-dented body panel and the radiused body sheet being displaced from the upper frame.

As noted, the body panel 26 may be "pre-dented" so as to create a uniform teaching tool, so that all students are presented with the same challenge. The body panels 26 may also be re-dented by the student or instructor. Either way, it may be desirable to have the body panel 26 be replaceable. With reference to FIG. 6, a dent removal teaching system 12 is shown with the body panel 26 removed from the upper frame 28. In this embodiment, a plurality of screw studs 60 may be positioned on the upper frame 28 that align with a plurality of holes 62 in the body panel 26. The body panel 26 may then be positioned with the holes 62 over the screw studs 60 and the body panel 26 may be secured in place to the upper frame 28 by a plurality of nuts 64.

Vehicle bodies also include curved areas, such as in a roof rail. The roof rail of a vehicle may include a curved portion, as is simulated by a radiused body sheet 66. The radiused body sheet 66 may be mounted to a roof rail frame 68, which may be releasable secured to either end of the upper frame 28. The radiused body sheet 66 may be releasably mounted to the roof rail frame 68 by a series of screw studs 60 provided on the roof rail frame 68. The roof rail frame 68 may receive the radiused body sheet 66 by the holes 62 and secured by the nuts 64, similar to that of the body panel 26.

Figure 7:
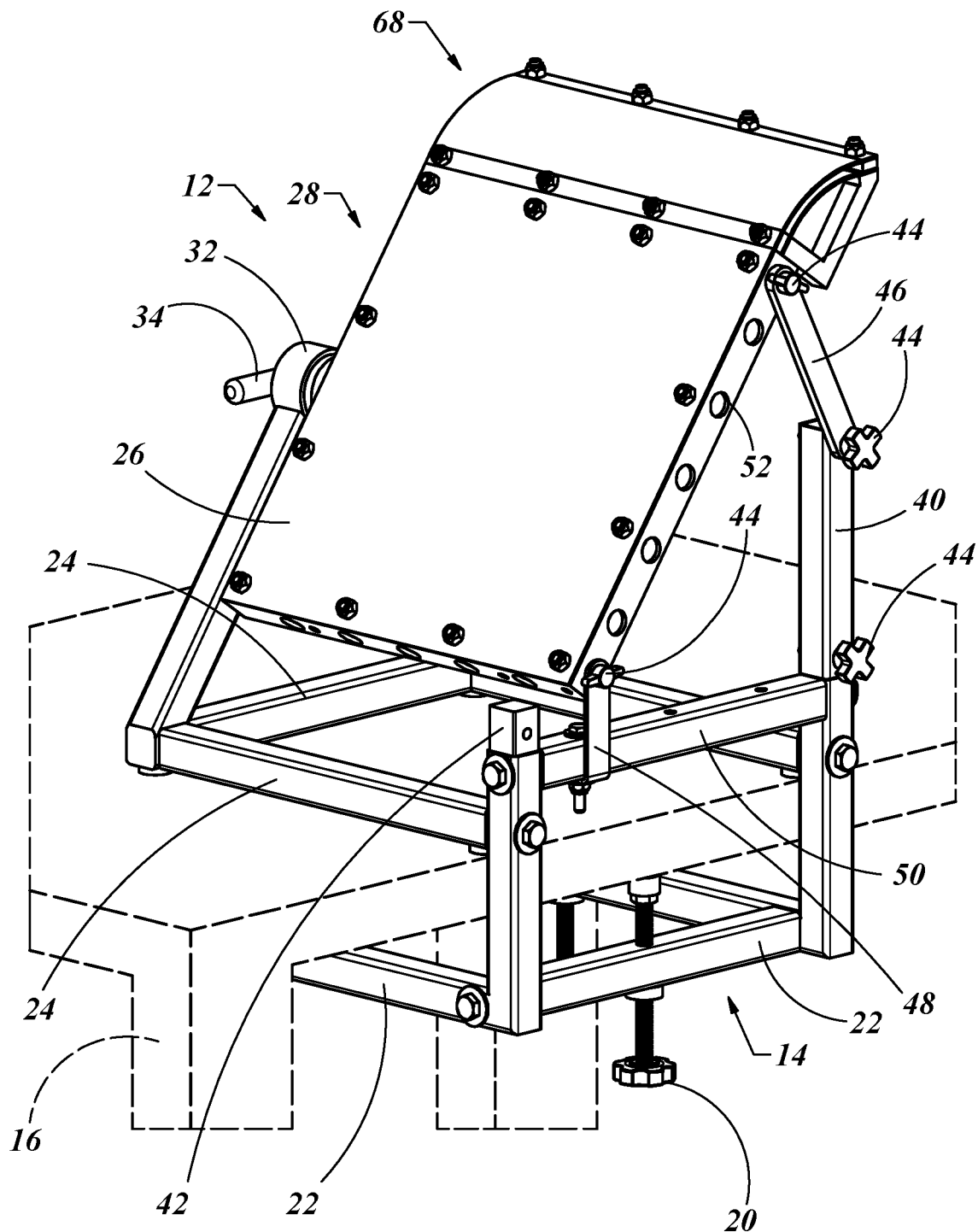
FIG. 7 is an isometric view of the dent removal teaching system of FIG. 3, where the upper frame has been repositioned to angle to the left.

As previously noted, it may be desirable to move the upper frame 28 relative to the base frame 14, and by doing so the upper frame 28 and the attached body panel 26, may be moved relative to the user. This may be an important feature in that a technician in the field may have a dent to be removed in any part of the vehicle body. This portion of the vehicle body may be inclined to the right or the left relative to the position of the technician Likewise, the area needing work may be vertical, facing right or left, or it may be horizontal. These five positions comprise a basic library of any condition a technician may realistically encounter in the field. As such, the dent removal teaching system 12 may allow for each of those five positions to be simulated. These are shown in FIGS. 7-10. The previous figures show the body panel 26 inclined to the right. In FIG. 7, the body panel 26 is inclined and facing the left. The methods to achieve the three points of support of the upper frame 28 to the base frame 14 that were shown and described in the previous figures in which the upper frame 28 was facing right, may also apply when the upper frame 28 is facing the left.

In FIGS. 8-9 the body panel 26 is vertical and facing the left. In this configuration, the screw lock 34 and a knob screw 44 securing the cross member 50 to a corner of the upper frame 28 are the only two mounting points of the upper frame 28 to the base frame 14. It is understood that the upper frame 28 could be rotated 180° about the screw lock 34 so that the body panel 26 faces to the right instead of to the left, as shown here. The mounting arrangement may be identical to that as shown, only with the body panel 26 facing the other way. In this embodiment, the connector link 46 and mount bracket 48 are shown to be connected to the base frame 14 as previously disclosed. This is not necessary in this configuration as these components are not used to secure the upper frame 28 to the base frame 14, but are included to show that they can be maintained in their relative positions if desired.

In FIGS. 8-9 the roof rail frame 68 and the associated radiused body sheet 66 have been removed from the upper frame 28. This is done to show the roof rail frame 68 may be removed if the user does not intend to work on a radiused body sheet 66 in this orientation. With the roof rail frame 68 removed, the user may more easily transition from the vertical position facing left to the vertical position facing right as the roof rail frame 68 may be positioned only on the upper side of the upper frame 28 in this configuration.

Another element shown in FIG. 9 is the use of a support brace 70. A support brace 70 may be similar to a reinforcement brace present in vehicle bodies used to add additional structural support to the vehicle body but being hidden on the underside of the vehicle body. In the dent removal teaching system 12, the support brace 70 may be a flat metal piece that may be releasably secured to the upper frame 28 on a side opposite to the body panel 26. In doing so, the support brace 70 may simulate a physical structure that may be used, or necessitate the need to work around, in order to remove a dent in the vehicle body, and so simulated by the body panel 26 of the dent removal teaching system 12.

Figure 10:
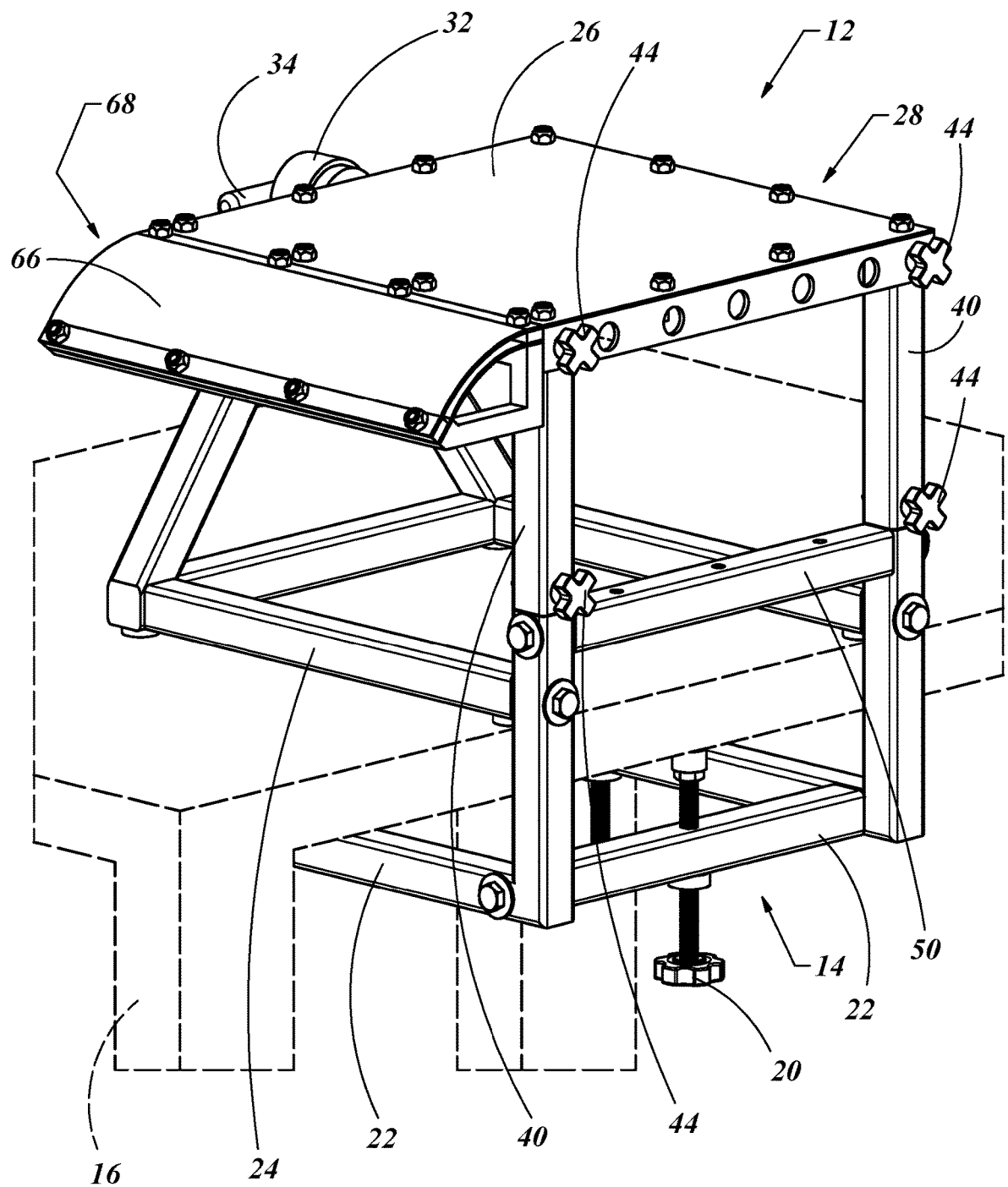
FIG. 10 is an isometric view of the dent removal teaching system of FIG. 3, where the upper frame is positioned horizontally.

The final configuration of the five suggested positions of the upper frame 28 is a horizontal position. This is illustrated in FIG. 10. Here the roof rail frame 68 has been mounted to the left side of the upper frame 28. It is understood that the roof rail frame 68 could be mounted to the right side of the upper frame 28 or omitted as previously shown. In this configuration, two removable vertical members 40 are both coupled to the base frame 14 over studs 42 (not shown in this view) and held in place by knob screws 44. The opposite ends of the removable vertical members 40 may then couple directly to the upper frame 28 by two additional knob screws 44. Here, the removable vertical member 40 on the left coupled to the left end of the upper frame 28 with the removable vertical member 40 on the right coupled to the right end of the upper frame 28 in addition to the screw lock 34 constitute the three points to secure the upper frame 28 to the base frame 14. The result is a rigid support of the upper frame 28 and therefore the body panel 26.

The foregoing detailed description of the present invention is provided for purpose of illustration, and it is not intended to be exhaustive or to limit the invention to the particular embodiment shown. The embodiments may provide different capabilities and benefits, depending on the configuration used to implement key features of the invention.

What is claimed is:

1. A dent removal teaching system, comprising: a stationary base frame including an upper support and a lower support positioned adjacent to the upper support, whereby a flat and horizontal secure object is received between the upper support and the lower support; the stationary base frame further including a mounting system comprising at least three clamps movably coupled to the lower support, the at least three clamps being movable in the direction of the upper support, thereby capturing the secure object between the at least three clamps and the upper support, thereby stabilizing the base frame; an upper frame including a side portion, the upper frame movably coupled directly to the stationary base frame, the upper frame also including a plurality of screw studs, the side portion including a plurality of access holes positioned perpendicular to the plurality of screw studs, whereby a dent removal tool may be inserted into one of the plurality of access holes; a body panel including a plurality of holes configured to be received by the plurality of screw studs in the upper frame, thus enabling the body panel to be releasably secured to the upper frame, whereby a user may apply force to a dent in the body panel using the dent removal tool, thereby providing a teaching environment to practice the removal of a dent from a simulated vehicle body; and further comprising a roof rail simulator releasably coupled to a first end of the upper frame, wherein the roof rail simulator includes a radiused body sheet releasably mounted to a roof rail frame by a series of screw studs provided on the roof rail frame.

2. The dent removal teaching system according to claim 1, wherein the upper frame is pivotally coupled to the stationary base frame.

3. The dent removal teaching system according to claim 2, wherein the upper frame is pivotally coupled to the stationary base frame by a screw lock.

4. The dent removal teaching system according to claim 1, wherein the upper frame is coupled to the stationary base frame by at least two points on the upper frame.

5. The dent removal teaching system according to claim 1, wherein the upper frame is movably coupled to the stationary base frame and capable of being locked into more than one position relative to the stationary base frame.

6. The dent removal teaching system according to claim 5, wherein the upper frame is movably coupled to the stationary base frame and capable of being locked into any of five different positions relative to the stationary base frame.

7. The dent removal teaching system according to claim 1, wherein the at least three clamps of the mounting system are screw clamps.

8. The dent removal teaching system according to claim 1, further comprising a support brace coupled to the upper frame opposite to the body panel, whereby the support brace simulates a reinforcement brace in a vehicle body.

9. A dent removal teaching system comprising:
   a base frame that is stationary and includes an articulating support, the base frame including an upper support and a lower support positioned adjacent to the upper support, whereby a flat and horizontal secure object is received between the upper support and the lower support;
   the base frame further including a mounting system comprising at least three clamps movably coupled to the lower support, the at least three clamps being movable in the direction of the upper support, thereby capturing the secure object between the at least three clamps and the upper support, thereby making the base frame stationary;

an upper frame with an articulating member coupled directly to the articulating support of the base frame, whereby the upper frame is movably securable to the base frame in more than one position relative to the base frame;

a roof rail simulator releasably coupled to a first end of the upper frame, wherein the roof rail simulator includes a radiused body sheet releasably mounted to a roof rail frame by a series of screw studs provided on the roof rail frame; and a plurality of body panels of a uniform size, each body panel of the plurality of body panels configured to be releasably secured to the top portion of the upper frame one at a time, wherein when one of the plurality of body panels is secured to the top portion of the upper frame, a user may perform a dent removal process comprising: applying force to a dent in the body panel, by way of a dent removal tool positioned through one of the plurality of access holes, to manipulate the dent, thus providing a teaching environment to practice the removal of a dent in a simulated vehicle body; replacing the secured body panel with another of the plurality of body panels; and then repeating the process.

10. The dent removal teaching system according to claim 9, wherein the upper frame is pivotally coupled to the base frame.

11. The dent removal teaching system according to claim 10, wherein the upper frame is pivotally coupled to the base frame by a screw lock.

12. The dent removal teaching system according to claim 9, wherein the upper frame is movably secured to the base frame at three non-collinear points on the upper frame.

13. The dent removal teaching system according to claim 9, wherein the upper frame is movably secured to the base frame and is capable of being locked into more than one position relative to the base frame.

14. The dent removal teaching system according to claim 13, wherein the upper frame is movably coupled to the base frame and is capable of being locked into any of five different positions relative to the base frame.

15. The dent removal teaching system according to claim 9, wherein the at least three clamps of the mounting system are screw clamps.

* * * * *